(12) United States Patent
Krause et al.

(10) Patent No.: US 6,331,692 B1
(45) Date of Patent: Dec. 18, 2001

(54) DIODE LASER, LASER OPTICS, DEVICE FOR LASER TREATMENT OF A WORKPIECE, PROCESS FOR A LASER TREATMENT OF WORKPIECE

(76) Inventors: Volker Krause, Kupferbergstr. 4, D-67292 Kirchheimbolanden; Christoph Ullmann, Pfarrer Hambuchenweg 11, D-53639 Konigswinter, both of (DE)

( * ) Notice: Subject to any disclaimer, the term of this patent is extended or adjusted under 35 U.S.C. 154(b) by 0 days.

(21) Appl. No.: 08/946,972

(22) Filed: Oct. 8, 1997

(30) Foreign Application Priority Data

Oct. 12, 1996 (DE) ................................ 196 42 194
Oct. 15, 1996 (DE) ................................ 196 42 504
Nov. 27, 1996 (DE) ................................ 196 49 113
Jan. 16, 1997 (DE) ................................ 197 01 222

(51) Int. Cl.[7] .................................................. B23K 26/06
(52) U.S. Cl. ........................ 219/121.73; 219/121.67; 219/121.72
(58) Field of Search .......................... 219/121.6, 121.67, 219/121.72, 121.73, 121.75, 121.76

(56) References Cited

U.S. PATENT DOCUMENTS

| 3,396,344 | | 8/1968 | Broom . | |
|---|---|---|---|---|
| 4,185,891 | * | 1/1980 | Kaestner . | |
| 4,318,594 | * | 3/1982 | Hanada . | |
| 4,530,574 | * | 7/1985 | Scifres et al. . | |
| 4,655,590 | * | 4/1987 | Aagano et al. | 219/121.76 X |
| 4,707,584 | * | 11/1987 | Kimbara | 219/121.76 X |
| 4,763,975 | | 8/1988 | Scifres et al. . | |
| 4,818,062 | | 4/1989 | Scifres et al. . | |
| 4,826,269 | * | 5/1989 | Streifer et al. | 359/19 |
| 4,978,197 | * | 12/1990 | Horikawa | 359/629 |
| 4,990,741 | * | 2/1991 | Moores et al. | 219/121.75 X |
| 5,066,100 | * | 11/1991 | Ferrante . | |
| 5,120,926 | * | 6/1992 | Marriott | 219/121.67 |
| 5,127,068 | | 6/1992 | Baer et al. . | |
| 5,168,401 | | 12/1992 | Endriz . | |
| 5,258,989 | | 11/1993 | Raven . | |
| 5,268,978 | | 12/1993 | Po et al. . | |
| 5,365,032 | * | 11/1994 | Muller et al. | 219/121.67 |
| 5,463,534 | * | 10/1995 | Raven . | |
| 5,541,951 | * | 7/1996 | Juhasz et al. . | |
| 5,715,270 | * | 2/1998 | Zediker et al. . | |
| 5,717,804 | * | 2/1998 | Pan et al. . | |
| 5,886,313 | * | 3/1999 | Krause et al. | 219/121.6 |
| 6,044,096 | * | 3/2000 | Wolak et al. . | |

FOREIGN PATENT DOCUMENTS

| 4234342 | * | 4/1994 | (DE) . | |
|---|---|---|---|---|
| 19507401 | * | 10/1995 | (DE) . | |
| 57-94482 | * | 6/1982 | (JP) | 219/121.75 |
| 61-134724 | * | 6/1986 | (JP) . | |

* cited by examiner

Primary Examiner—Geoffrey S. Evans

(57) ABSTRACT

The invention relates to a novel design of a diode laser, especially for laser treatment of workpieces. As the beam source there is at least one laser chip which has at least one laser light emitter which lies with its active layer perpendicular to a first axial direction (Y-axis; Z-axis) and which extends in a second axial direction (X-axis), or several emitters provided next to one another in the second axial direction, the second axial direction (X-axis) being perpendicular to the first axial direction (Y-axis, Z-axis).

19 Claims, 11 Drawing Sheets

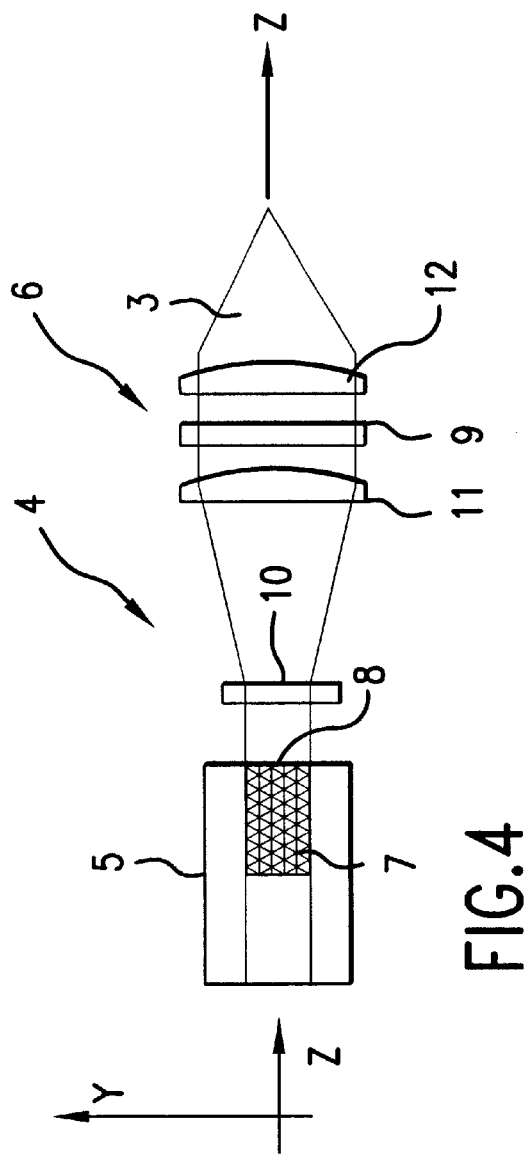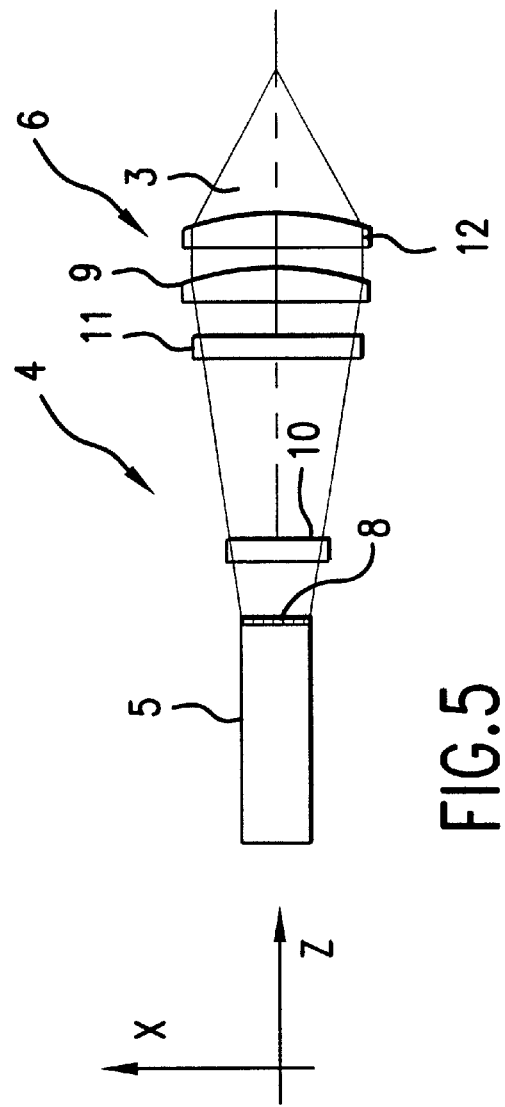

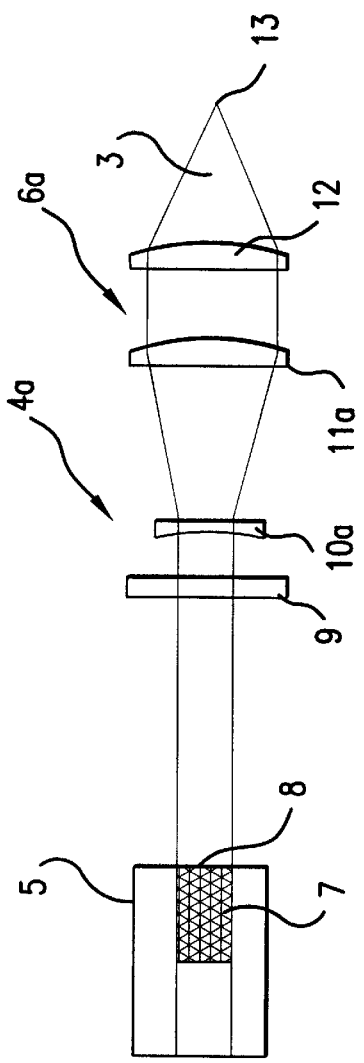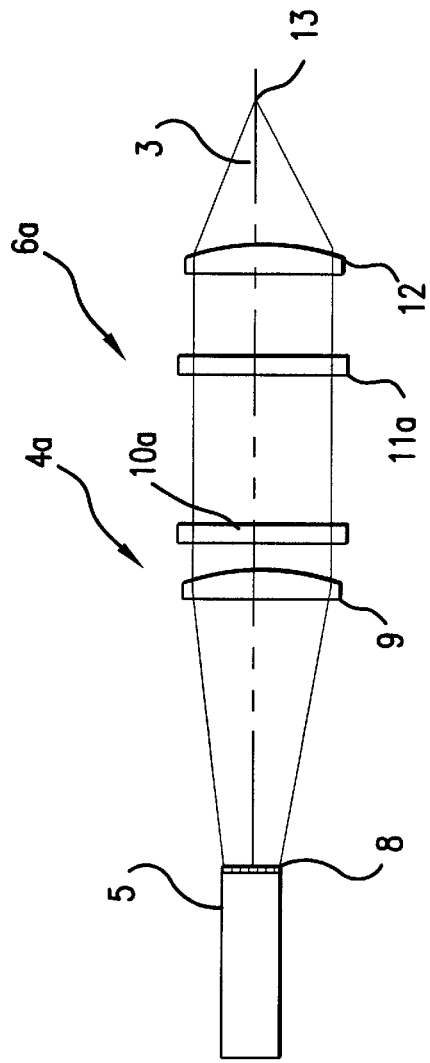
FIG.6
FIG.7

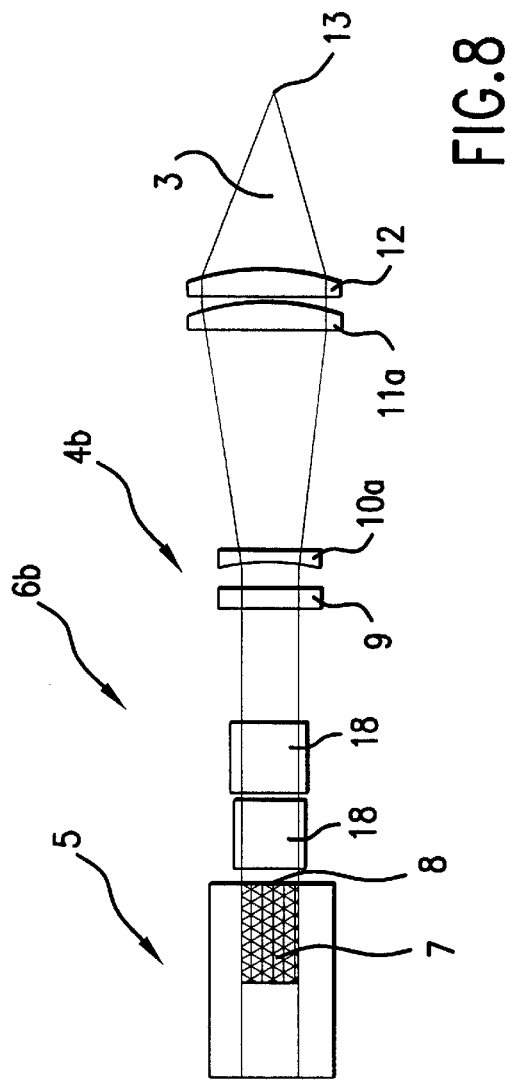
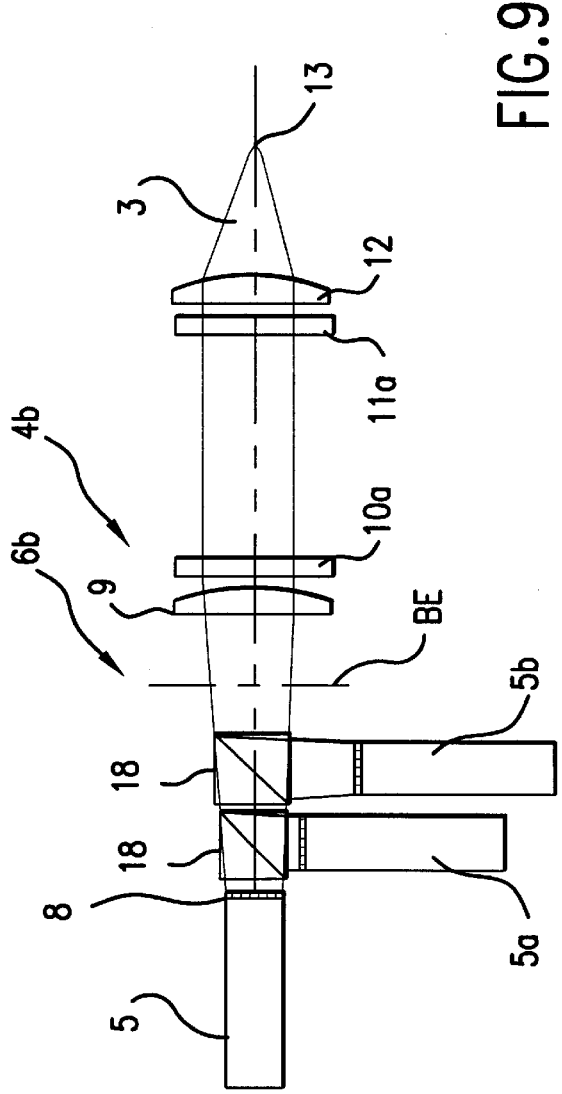
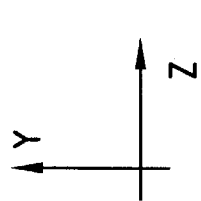
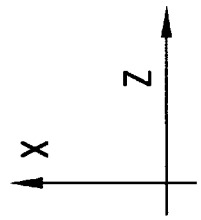
FIG.8
FIG.9

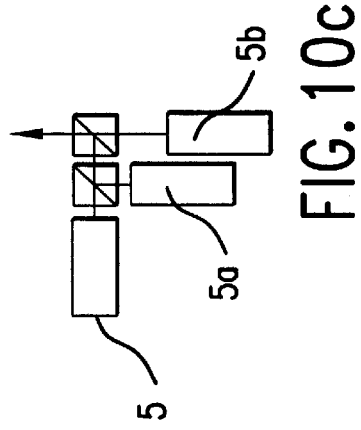
FIG. 10a
FIG. 10b
FIG. 10c
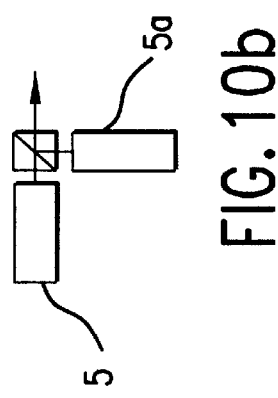
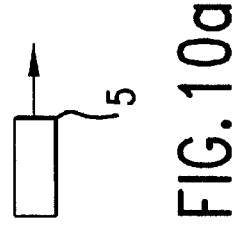
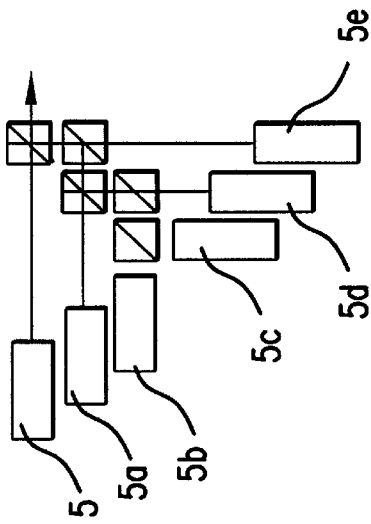
FIG. 10d
FIG. 10e
FIG. 10f
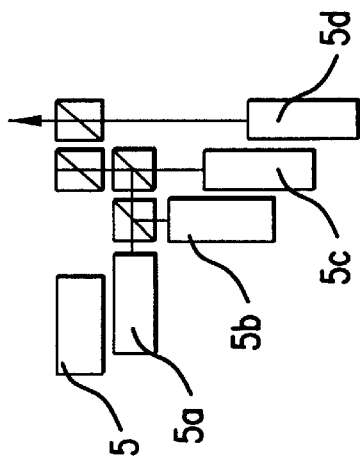
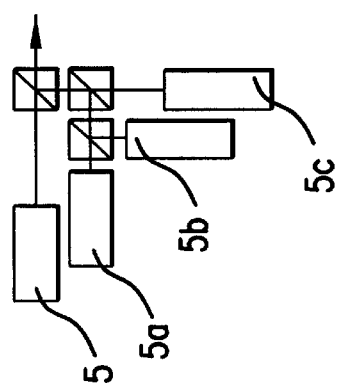

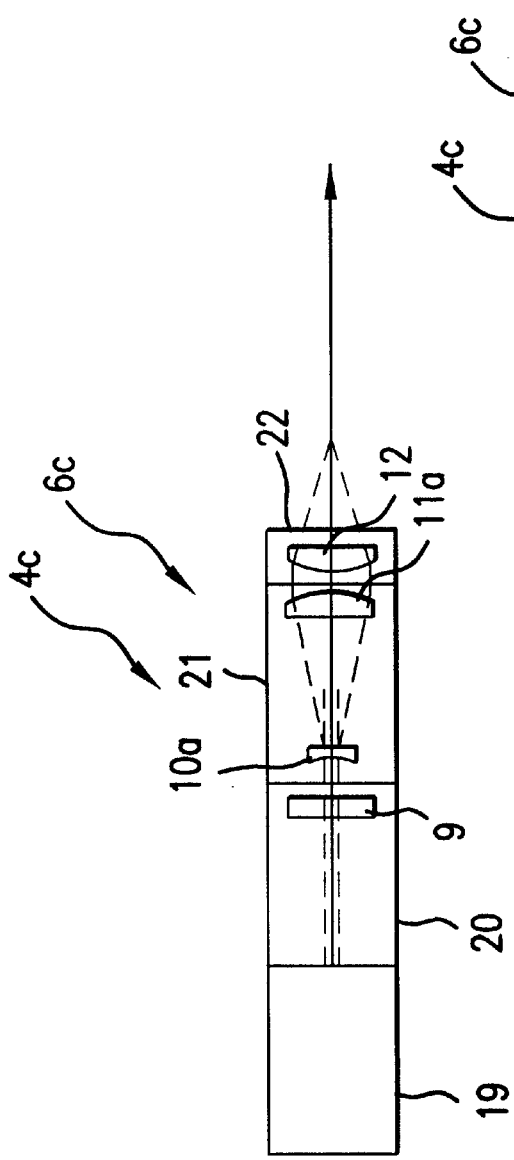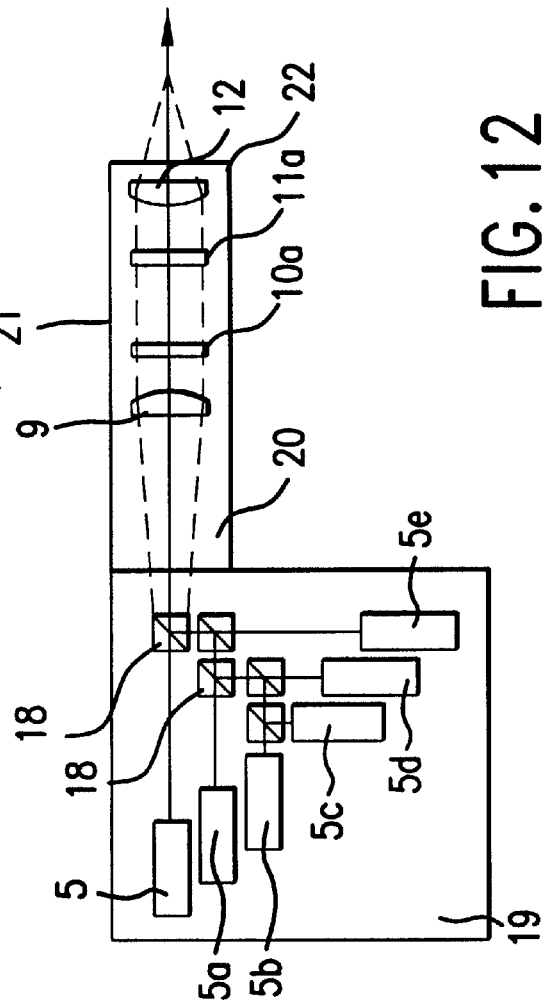

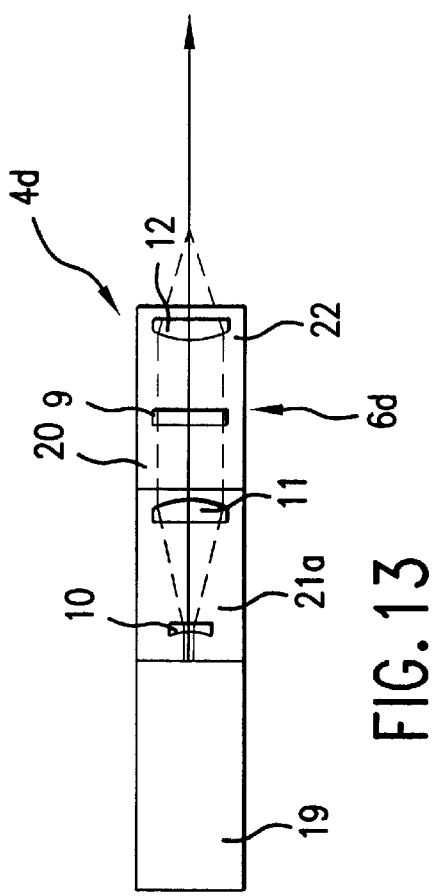
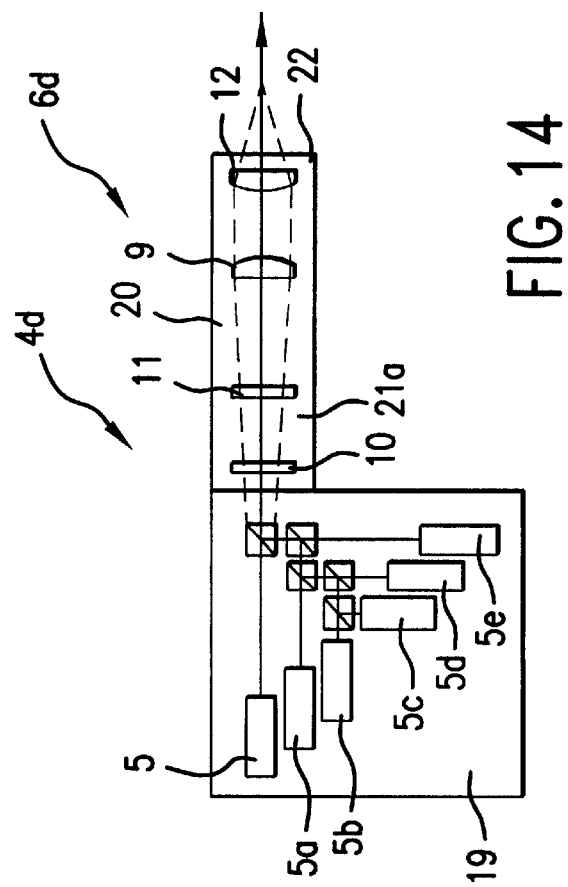

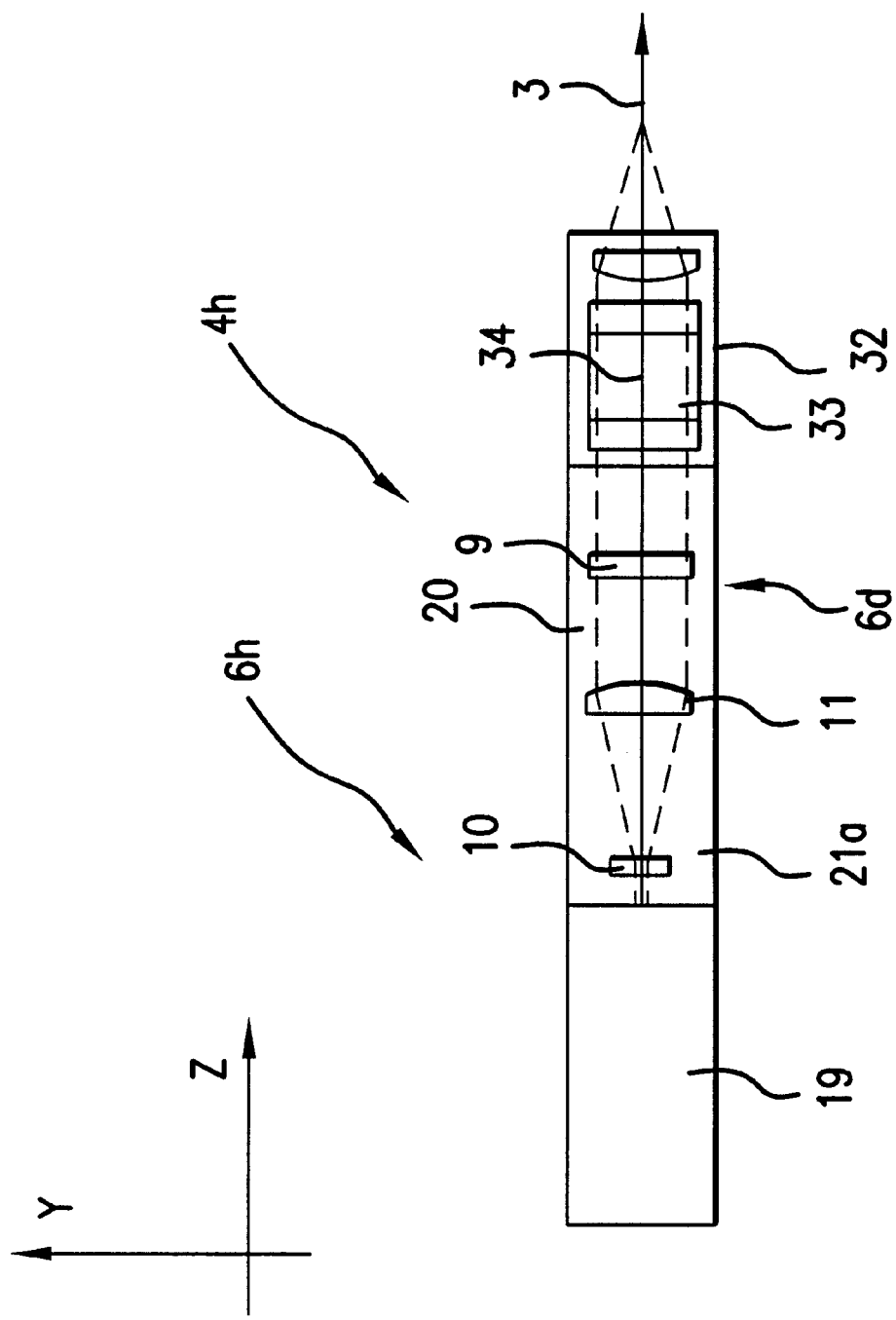

DIODE LASER, LASER OPTICS, DEVICE FOR LASER TREATMENT OF A WORKPIECE, PROCESS FOR A LASER TREATMENT OF WORKPIECE

BACKGROUND OF THE INVENTION

The invention relates to a device and process for the laser treatment of a workpiece.

Diode lasers are known and have been used for the laser machining of workpieces. As a result of the resonator geometry of diode lasers or their laser chips, the laser beam of these lasers has a relatively large angle of divergence (greater than 1000 mrad) in the plane perpendicular to the active layer of the semiconductor (also the fast axis), while in the plane parallel to the active layer (also the slow axis) the angle of divergence is much smaller, for example, 100 to 200 mrad. These angles of divergence are too large for direct use of laser radiation for machining of workpieces or materials, so that optical preparation of the radiation by microoptics is necessary and conventional.

If one were to use a transversely lying microcylinder lens for each semiconductor chip or for all emitters formed thereon, the beam divergence in the plane perpendicular to the active layer can be reduced to roughly 10 mrad. The beam pencil present with 10×180 mrad divergence in the two axial directions can be further worked by optics with the f/# ranging from f/1.5 to f/4. When one such beam is focussed the picture of a line appears, i.e. of a line focus, that is, as an image of the emitter of the respective laser chip which are distributed in a line next to one another over the width (conventionally roughly 10 mm) of the chip.

Since this line focus is perceived as disruptive, an attempt is made using optical means to attain resolution of this line focus, i.e. shaping of the laser beam for formation into a uniform focus as circular as possible, by concentrating numerous optical fibers in a circular cross section (U.S. Pat. No. 5,127,068; U.S. Pat. No. 4,763,975; U.S. Pat. No. 4,818,062; U.S. Pat. No. 5,268,978; and U.S. Pat. No. 5,258,989) by socalled beam turning, in which rearrangement of the individual laser beams to achieve a focus as circular as possible takes place (U.S. Pat. No. 5,168,401, FP 0 484 276; WO 95/15510; DE 44 38 368) or by parallel shifting of individual laser beams (U.S. Pat. No. 3,396,344; DE 195 00 513; DE 195 44 448).

These known processes allow almost uniform beam quality, i.e. especially uniform beam divergence and uniform beam cross section in two axial directions. Known methods however can only be accomplished with a relatively high cost in laser optics. Diode lasers with high output power become more expensive and are not competitive with conventional lasers. Furthermore, known methods of improving beam quality due to the complexity of optical components are associated with large losses in power density. In practice, with these known arrangements only power densities of $10^4$ to $10^5$ W/cm$^2$ are achieved. However power densities between $10^6$ and $10^7$ W/cm$^2$ would be possible without the lens defects and losses which occur in these optics.

The object of the invention is to avoid these defects and to devise a device and process for laser machining of workpieces using a laser head having at least one diode laser, in which the aforementioned defects are avoided. To achieve this object a device and process according to the present invention are formed.

SUMMARY OF THE INVENTION

In the device or in the process for laser machining of workpieces, shaping of the laser beam into an almost circularly focussable beam is intentionally abandoned. Rather the line focus is used. With a curved working or machining contour, the focus line is aligned such that this focus line with its longitudinal extension, forms at each point of this contour its tangent. This has the advantage that in spite of the line focus and in spite of avoiding expensive optical shaping a narrow working or machining contour is achieved. Furthermore, a higher power density than in the prior art is achieved in the invention.

BRIEF DESCRIPTION OF THE DRAWINGS

The invention is detailed below using figures on embodiments.

FIG. 4 shows in a simplified representation a section through a laser diode arrangement consisting of a plurality of laser chips stacked on top of one another, which each form a plurality of emitters which are distributed over the chip width and which are located next to one another, together with laser optics in a section perpendicular to the active layer of the lasers chip or its emitters;

FIG. 5 shows a section through the diode laser arrangement and the laser optics of FIG. 4 in a sectional plane parallel to the active layers of the diode elements;

FIGS. 6 and 7 show in representations similar to FIGS. 4 and 5 the diode laser arrangement together with the laser optics in a section perpendicular to the active layer of the diode elements (FIG. 6) or parallel to the active layer (FIG. 7) in another possible embodiment;

FIGS. 8 and 9 show sectional representations similar to FIGS. 4 and 5 in a plane perpendicular to the active layer (FIG. 8) and in a plane parallel to the active layer (FIG. 9) in another embodiment in which a total of three laser diode arrangements are used;

FIG. 10 shows in positions a–f for purposes of explanation different possibilities for use of diode laser arrangements, especially also for frequency multiplexing;

FIGS. 11 and 12 show in representations similar to FIGS. 8 and 9 a diode laser in a modular design and in a section perpendicular to the active layer of the diode elements (FIG. 11) and parallel to the active layer (FIG. 12);

FIGS. 13 and 14 show in representations similar to FIGS. 11 and 12 a diode laser in a modular design and in a section perpendicular to the active layer of the diode elements (FIG. 13) and parallel to the active layer (FIG. 14);

FIGS. 15 and 16 show in representations similar to FIGS. 13 and 14 a diode laser or laser optics with optical means for rotating the laser beam or focus line;

DETAILED DESCRIPTION OF THE PREFERRED EMBODIMENTS

Figure 2:
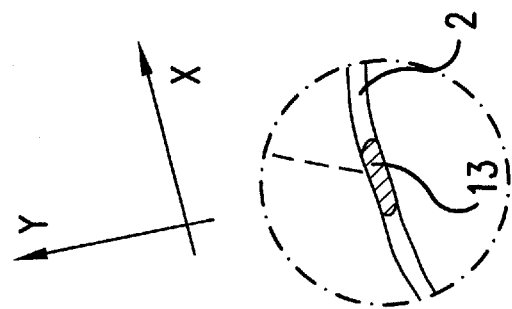
FIG. 2 shows a machining contour in an individual representation.
Figure 3:
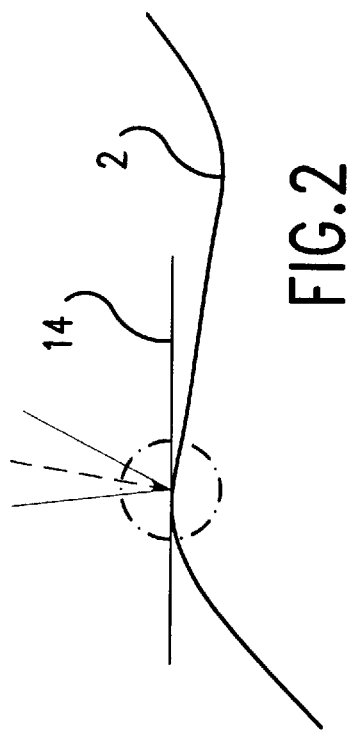
FIG. 3 shows in an enlarged representation the focus of a laser beam on the workpiece in the area of the machining contour.
Figure 1:
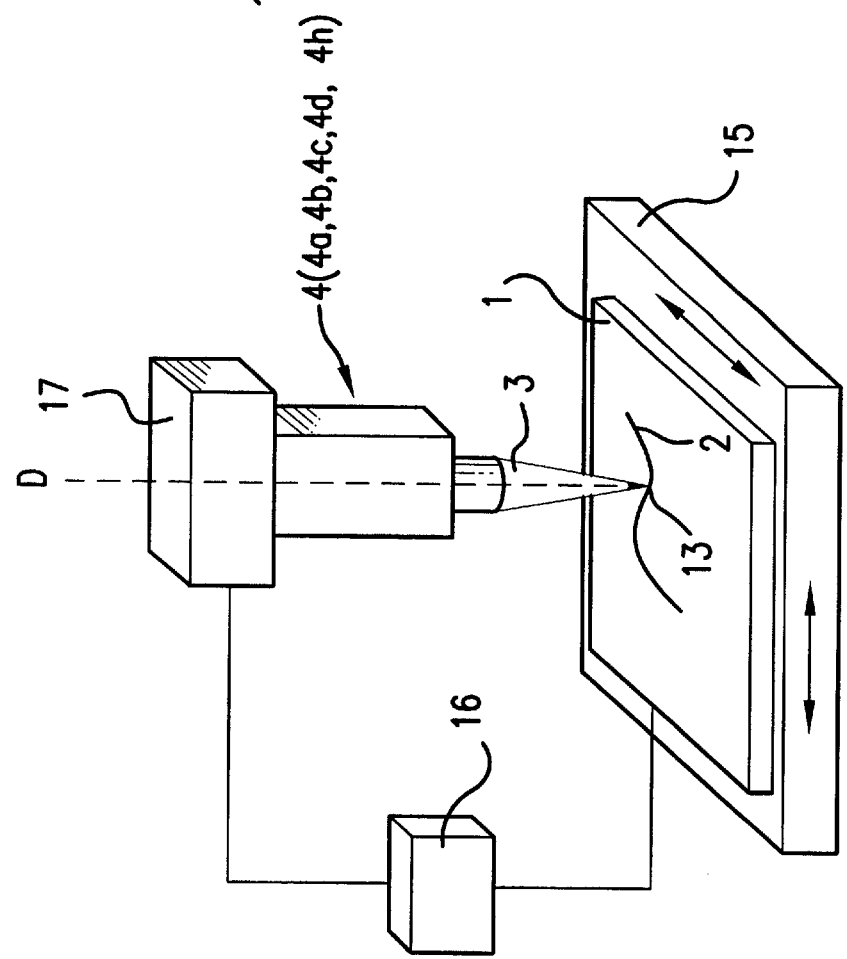
FIG. 1 shows in a simplified perspective view a device as claimed in the invention for machining workpieces by means of a laser beam.

FIG. 1 shows a workpiece which for the sake of simpler representation is shown as a plate and which is to be worked, for example welded or cut, along curved contour 2 with focussed laser beam 3.

To produce laser beam 3, diode laser 4 which is shown in FIGS. 4 and 5 is used; it consists of diode laser arrangement 5 and laser optics 6. To simplify the description, FIGS. 4 and 5, but also FIGS. 6–9 label by X, Y and Z respectively the three coordinate directions perpendicular to one another which are hereinafter called the X-axis, Y-axis, and Z-axis.

Laser diode arrangement 5 consists of several laser chips 7 which with their surface sides and active layers lie in planes perpendicular to the plane of the drawing in FIG. 4 which is defined by the Y-axis and Z-axis, i.e. in the planes which are defined by the X-axis and Z-axis. The laser chips are stacked on top of one another in the direction of the Y-axis, together with substrates which are not shown and which each form a heat sink for the laser chips. Each laser chip 7 forms several diode elements or emitters which emit the laser light and which are offset to one another in the direction of the X-axis. The Z-axis forms the optical axis of laser optics 6.

As a result of the resonance geometry of the laser chips and their emitters, the laser beam produced by the emitters has a very large angle of divergence of more than 1000 mrad in the plane or axis perpendicular to the active layer, i.e. in the representation chosen for FIGS. 4 and 5 in the Y-axis (also the fast axis) or Y-Z plane and a smaller angle of divergence of roughly 100 to 200 mrad in the plane or axis parallel to the active layer (also the slow axis) or in the X-Z plane. It is essential to undertake collimation of the laser radiation both in the slow axis and fast axis, in the fast axis by fast axis collimator 8 which consists of an arrangement of a plurality of microcylindrical lenses, and one each microcylinder lens which extends in the direction of the X-axis for each laser diode chip 7. With this fast axis collimator 8, the beam divergence in the fast axis can be reduced to roughly 10 mrad at present, i.e. with conventional lenses. Smaller beam divergence is also possible. For collimation in the slow axis (X-axis), there is slow axis collimator 9, likewise formed as a cylindrical lens.

Collimators 8 and 9 are a component of laser optics 6. It also contains beam expanding optics which is formed by cylinder lenses 10 and 11, and located between fast axis collimator 8 and slow axis collimator 9 in the beam path of the laser radiation and with which the laser radiation which is essentially parallel in the plane perpendicular to the active layer of laser chip 7 is expanded, roughly at a factor 1.5 to 4, the beam divergence in the direction of the fast axis (Y-axis) then being roughly 2.5 to 7 mrad. Using focussing optics 12 which is shown in FIGS. 4 and 5, as a spherical lens, and which has a focal width f=100 mm, the laser beam is focussed such that it forms on workpiece 1 a linear focus or line focus 13 which has a small focal width of 0.25 to 0.7 mm. The greater length of the line focus is determined by the dimensions of laser chips 7 in the direction of the X-axis.

Since the expanding optics is formed by cylindrical lenses 10 and 11, with cylinder axes in the X-axis, expansion takes place solely in the plane perpendicular to the active layer such that following cylinder lens 11 in this plane, divergence which is reduced compared to the beam divergence after collimator 8 is achieved and following slow axis collimator 9 a laser beam pencil parallel in the plane parallel to the active layer is also obtained which is focussed using focussing optics 12. Widening the beam in the plane perpendicular to the active layer with subsequent focussing results in a high power density, due to the small focal width of the line focus.

Laser optics 6 allows a relatively large distance between diode laser arrangement 5 and line focus 13 on workpiece 1 or the working point formed by this line focus 13, such that diode laser arrangement 5 is reliably protected against fouling, etc.

Since line focus 13 has a length dictated by the distribution of emitters of laser chips 7 in the direction of the X-axis, which is much greater than the width of the line focus, the movement of line focus 13, along curved machining contour 2, takes place such that this line focus 13 with its longitudinal axis at each point of the curved machining contour forms tangent 14 to this working contour.

For this machining, workpiece 1 is clamped on table 15, which can be moved, by control means 16, in two axes which run perpendicular to one another, in the embodiment shown around the Y-axis and X-axis, which also define the top side of workpiece 1. Above table 15 is the laser head or diode laser 4 which is oriented with the Z-axis perpendicular to the plane of the table or workpiece 1 and which is held on rotary means 17 with which diode laser 4 can be turned around axis of rotation D, i.e. around the Z-axis or around the optical axis of its laser optics 6. Rotary means 17 is likewise controlled by control means 16, according to a given program corresponding to machining contour 2 such that in the aforementioned manner line focus 13 with its longitudinal extension forms tangent 14 to machining contour 2. To produce machining contour 2 the table with workpiece 1 is moved accordingly in the Y-axis and X-axis. The axis of rotation around which diode laser 4 is turned by rotary means 17 is also in the center of line focus 13 produced by this diode laser. The described device allows laser machining of workpieces 1 along very narrow machining contour 2 with high power and power density.

FIGS. 6 and 7 show diode laser 4a which differs from the diode laser of FIGS. 4 and 5 essentially in that for laser optics 6a there expansion optics formed by cylindrical lenses 10a and 11a is provided for the beam path of the laser beam following slow axis collimator 9, and in turn in the beam path of focussing optics 12.

FIGS. 8 and 9 show diode laser 4b which corresponds to diode laser 4a of FIGS. 6 and 7 with regard to its laser optics 6b, but which in addition to diode laser arrangement 5 has two more diode laser arrangements 5a and 5b, each with its own fast axis collimator 8, and with laser light coupled via optical coupling elements 18 into the beam path of diode laser arrangement 5, between fast axis collimator 8 of diode laser arrangement 5 and slow axis collimator 9 which is provided jointly for all diode laser arrangements 5–5b of diode laser 4b. Diode laser arrangements 5a and 5b are oriented such that the planes are parallel to the active layers of laser chips 7 of these arrangements perpendicular to the Z-axis. The emitters of laser chips 7 of diode laser arrangements 5a and 5b are offset against one another on each chip 7 in turn in the direction of the X-axis. Furthermore, for diode laser arrangements 5a and 5b the Z-axis is perpendicular to the planes of the active layers.

Two coupling elements 18 are cascaded, i.e. arranged behind one another in the beam path between fast axis collimator 8 of diode laser arrangement 5 and slow axis collimator 9. In the embodiments shown, coupling elements 18 are edge filters and diode laser arrangements 5, 5a, and 5b are chosen such that the laser light produced by these arrangements has a different wavelength and is matched to the filter characteristics. The wavelength of laser diode arrangement 5 is for example smaller than the wavelength of laser diode arrangement 5a and this in turn is smaller than the wavelength of laser diode arrangement 5b. Other versions are also conceivable. In particular, it is also conceivable that laser light from only two diode laser arrangements or from more than three diode laser arrangements could be combined or added. Combining several diode laser arrangements allows maximum power density in the machining area at the cost of the broad optical spectrum of the entire laser.

In diode laser 4b, it is important that the optical path length of the light paths between the active areas, i.e. the emitters of diode laser arrangement 5, 5a, 5b and any reference plane BE perpendicular to the Z-axis in the beam path following optical coupling elements 18, is the same.

Like diode laser 4, diode lasers 4a and 4b on rotation unit 17 are also used such that when machining workpiece 1 along machining contour 2, in turn by controlled rotation around axis of rotation D line focus 13 in the above described manner is oriented with respect to the progression of machining contour 2.

It was assumed above that respective diode laser 4, 4a or 4b is oriented with the optical axis of its laser optics 6 perpendicular to the plane of workpiece 1 and thus the Y-axis and X-axis of the respective diode laser at the same time also define the plane of workpiece 1. Different versions are also conceivable here in which the laser beam of the diode laser is deflected and after this deflection forms line focus 13. In this case as well, rotation takes place by rotation unit 17 around axis of rotation D which is the center axis of line focus 13, the plane of workpiece 1 being determined in any case by the Y-axis and X-axis of diode laser 4.

Electric power supply of respective diode laser 4, 4a, or 4b provided on rotation unit 17 takes place via sliding contacts or via electrical cables which enable repeated turning. In the latter case then, at the end of each machining process, rotation unit 17 with diode laser 4, 4a or 4b is turned back to its initial position. Cooling medium is supplied to and removed from diode laser 4, 4a or 4b preferably via rotary couplings.

The described device is suitable for example for welding jobs (also seam welding) or cutting tasks. By guiding or controlling the orientation of the respective diode laser, weld seams or cuts with a very narrow width can be made, by which also the welding or cutting speed can be increased and the heat losses minimized. By coupling several diode laser arrangements via coupling elements 18 and also by expanding the beam, the power density is greatly increased so that welding by means of the deep welding effect becomes possible. Uniform machining behavior is achieved in all directions of the progression of this machining contour by the described alignment of line focus 13 with reference to the machining contour.

The described device is also suitable for soldering processes. In particular, depending on the location of the soldering points, it is a good idea to align line focus 13. The invention was described above using embodiments. It goes without saying that numerous changes and modifications are possible without departing from the inventive idea underlying the invention. Thus it is also fundamentally possible to place diode laser 4, 4a or 4b or the laser head having this diode laser stationary and to align line focus 13 tangentially to the machining contour by moving the optics or part of the optics of the diode laser or laser head in a controlled manner.

Thus, it is possible to use a different telescopic arrangement of lenses or mirrors for beam expansion instead of cylinder lenses 10, 10a, and 11 or 11a. Furthermore, other optical arrangements or components 18 are possible, such as filter arrangements, especially short and longpass filters, optical arrangements for coupling of radiation polarized in different planes, etc.

FIGS. 10 to 14 show other possible embodiments of the diode laser. FIG. 10 again schematically shows different possibilities for use of diode laser arrangements in positions. Position a shows use of single diode laser arrangement 5, as is described also in FIGS. 4 and 5 or 6 and 7 for diode lasers 4 and 4a there.

Position b shows two diode laser arrangements 5 and 5a with radiation added via optical coupling element 18 to form overall radiation.

Position c shows three diode laser arrangements 5, 5a, and 5b coupled via coupling elements 18, corresponding to diode laser 4b.

Positions d–f show other possibilities of coupling of a total of four diode laser arrangements 5–5c using three coupling elements (position d), coupling of five diode laser arrangements 5–5d using four coupling elements 18 (position e), and coupling of a total of six diode laser arrangements (5–5e) using a total of five coupling elements 18.

Coupling elements 18 are preferably in turn made as edge filters or other optical arrangements or elements such as filter arrangements, especially shortpass and longpass filters, an optical arrangement for coupling in different planes of polarized radiation, etc. In each case, coupling elements 18 are formed such that they enable combination or addition of the beams of individual diode laser arrangements 5–5e with as little loss as possible.

FIGS. 11 and 12 show as another possible embodiment diode laser 4c in which via five coupling elements 18 radiation from a total of six diode laser arrangements 5–5e is coupled or added to form overall radiation. The fast axis collimators in this embodiment or in laser optics 6c there which corresponds in its basic structure to laser optics 6a are in turn each on pertinent diode laser arrangement 5–5e. Diode laser arrangements 5–5e, their fast axis collimators, and optical coupling elements 18 are located in module 19.

In addition to this module 19, there are other modules 20, 21 and 22, of which module 20 contains slow axis collimator 9, module 21 contains beam expansion, i.e. cylinder lenses 10a and 11a, and module 22 contains the focussing optics. Modules 20, 21 and 22 are thus attached to one another and to module 19 so that for diode laser 4c there is laser optics 6c which corresponds to the optics of diode laser 4a and in which beam expansion takes place in the beam path following slow axis collimator 9 and in front of focussing optics 12.

FIGS. 13 and 14 show diode laser 4d which is in turn modular, i.e. consists of several modules, specifically of module 19 with diode laser arrangements 5–5e and coupling elements 18, of module 20 with slow axis collimator 9, of module 21a with cylindrical beam expansion, i.e. with cylinder lenses 10 and 11, and of module 22 with focussing optics 12.

The individual modules in diode laser 4d are provided on one another such that laser optics 6d corresponding to diode laser 4 or laser optics 6 is achieved in which there is cylindrical beam widening (cylinder lenses 10 and 11) in the beam path in front of slow axis collimator 9.

The modularity of diode lasers 4c and 4d among others has the advantage that with a stipulated number of components the most varied diode lasers and/or laser optics for the most varied applications can be accomplished especially with respect to power, etc. Thus, instead of module 19 with a total of six diode laser arrangements (5–5e) a module can also be used which has a different number of diode laser arrangements corresponding to positions a–e of FIG. 10.

Figure 16:
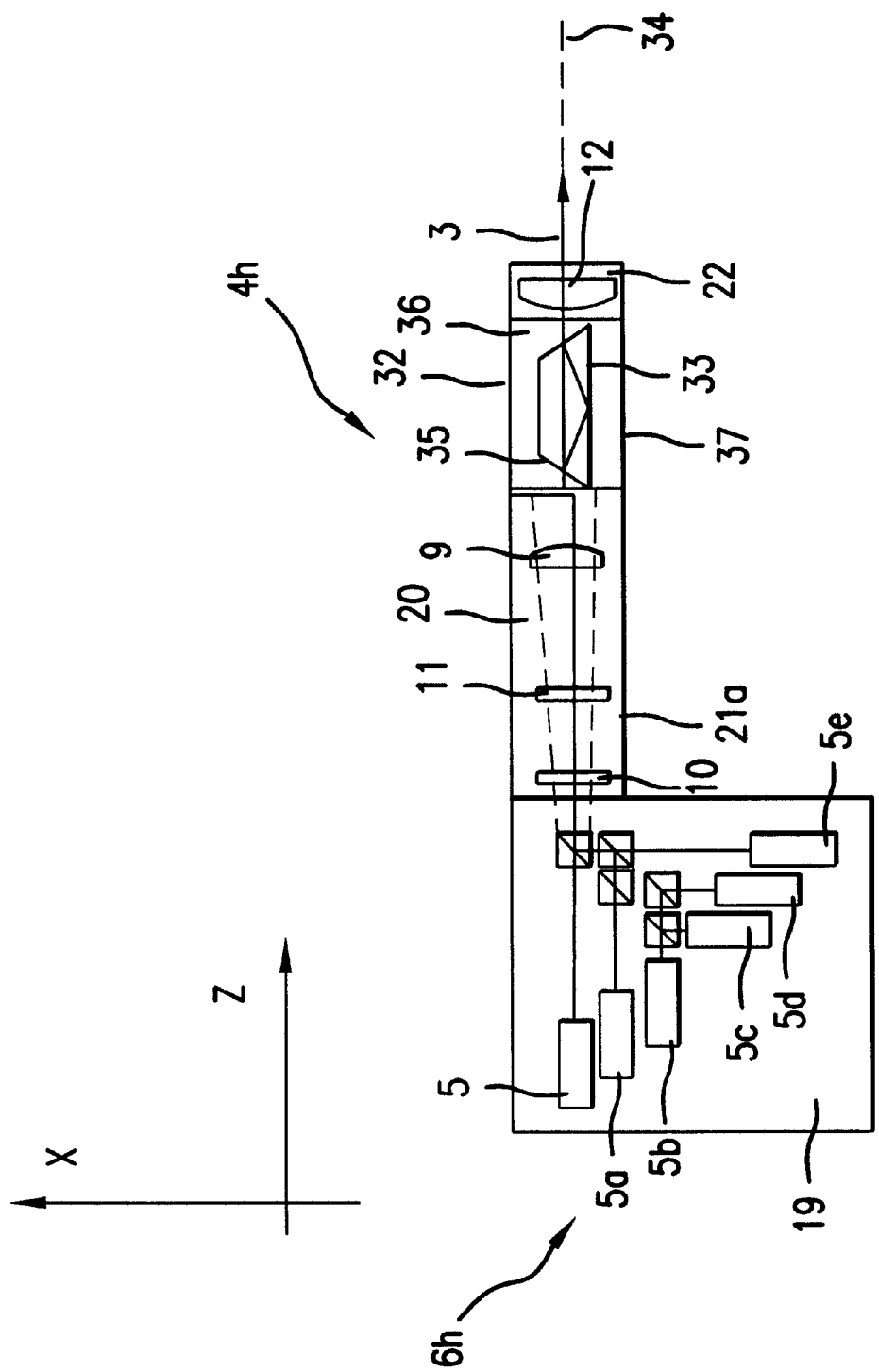

FIGS. 15 and 16 show diode laser 4h with laser optics 6h which corresponds for the most part to laser optics 6e of FIGS. 13 and 14, i.e. has modules 20, 21a and 22. In the beam path of laser optics 6h, between modules 20 and 22 there is also rotary module 32 with which rotation of laser beam 3 and thus line focus 13 is possible, this rotary module 32 can being located elsewhere. As a functional element, rotary module 32 contains optical prism 33 which is made as a Dove prism in the embodiment shown and which has a trapezoidal cross section in the cross sectional plane which includes optical axis 34 of rotary module 32, the lateral surfaces which intersect optical axis 34 at an angle forming beam entry surface 35 or beam exit surface 36. As FIG. 16 shows, laser beam 3 is diffracted on beam entry surface 35 when it enters prism 33, then reflected on lower surface 37 which forms the base of the trapezoidal cross section with total reflection, and is re-diffracted upon emerging on beam exit surface 36, so that the center axis of laser beam 3 coincides with optical axis 34 both in front of prism 33 and also following this prism. Prism 33 is driven peripherally around its beam axis for rotation of beam 3 by a drive which is not shown, such as an electric motor.

Figure 17:
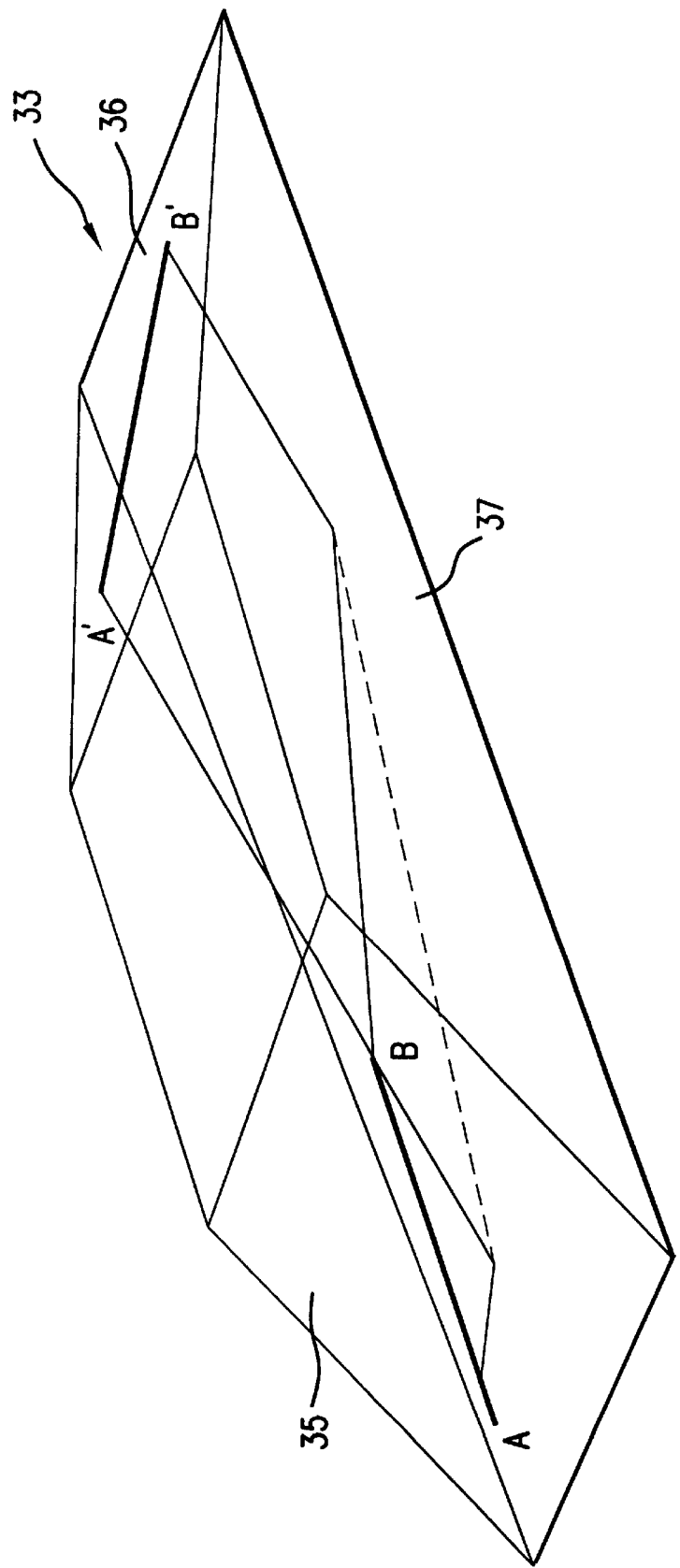
FIG. 17 shows in an enlarged perspective representation a rotating or Dove prism for use in the diode laser from FIGS. 15 and 16.
Figure 18A:
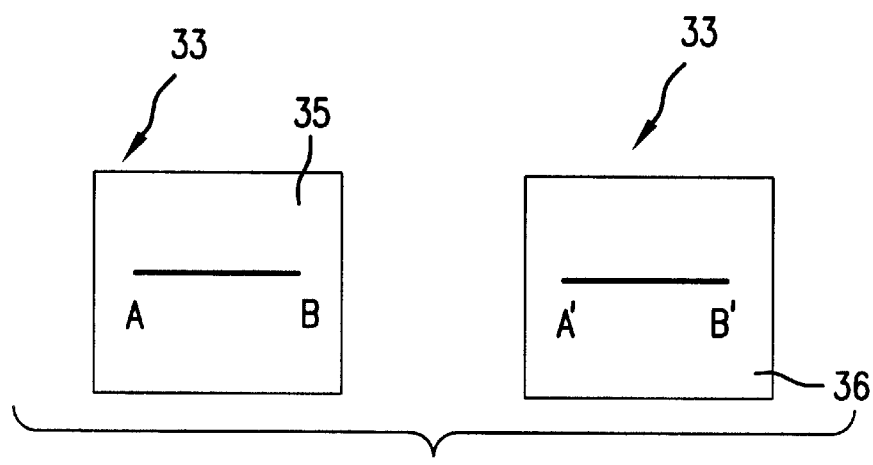
FIG. 18 shows in positions a–b overhead views on the front and back surface of the rotary prism, together with the virtual image of a strip-shaped incident or emerging laser beam in different rotary positions of the rotary prism.
Figure 18B:
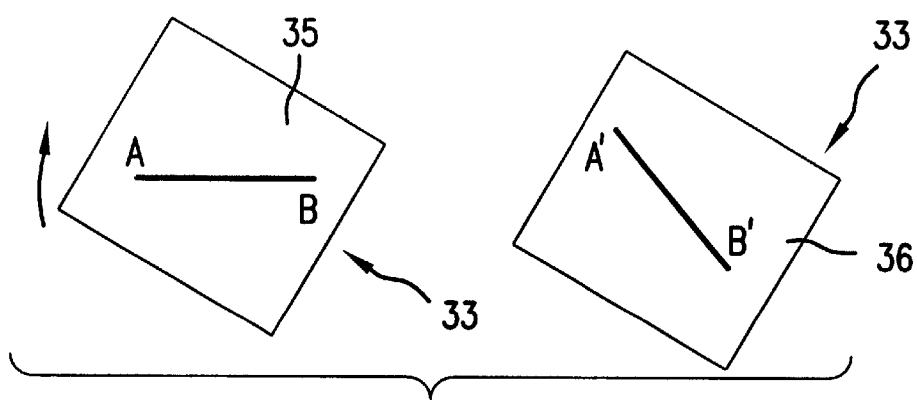
Figure 18C:
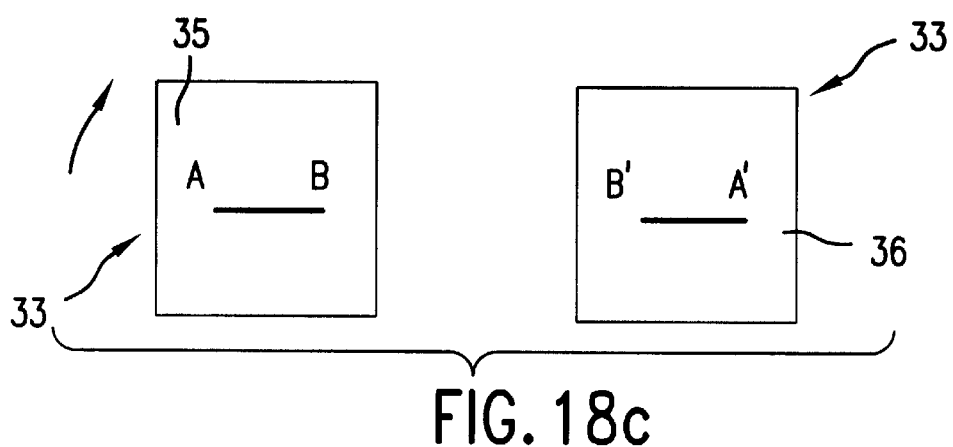

FIGS. 17 and 18 explain the optical action of rotary prism 33. In these Figures, it is assumed that the laser beam emerging from beam exit surface 36 and incident on beam entry surface 35 is a flat, strip-shaped beam. The entering laser beam in positions a–c of FIG. 18 is labeled with the segment AB. The laser beam emerging on beam exit surface 36 is labeled with segment A'B'.

Positions a–c give three different rotary positions of rotary prism 33. The figures show that with uniform orientation of laser beam 3 incident on beam entry surface 35, the laser beam emerging on beam exit surface 36 or segment A'B' which defines the orientation rotates around this optical axis 34. This follows from the above described diffraction of the beam on surface 35 and 36 and from reflection on surface 37 as is shown again in FIG. 17.

By using rotation module 32, it is possible to provide a diode laser 4h without the capacity to turn on a part of the device, i.e. to abandon rotation unit 7. But it is also possible to use both rotation unit 17 and also rotary module 32 if this is necessary or feasible for special machining and/or controls.

It was assumed above that rotary prism 33 is rotated around its optical axis 34. of course swivelling of the prism around this axis is conceivable when this is necessary for special applications. Instead of rotary prism 33, other optical arrangements can also be used which have properties corresponding to a Dove prism, i.e. especially means in which the laser beam entering in one optical axis is deflected or diffracted first obliquely to this axis, then reflected in the direction to the optical axis and then deflected or diffracted again so that the beam runs again in the optical axis.

In laser optics 6h there is rotary module 32 or rotary prism 33 in the beam path following mirror arrangement 25 and correction prism 26. Basically rotary prism 33 could also be provided elsewhere in the beam path, but preferably wherever the beam divergences are as small as possible.

Reference Number List
1 workpiece
2 machining contour
3 laser beam
4, 4a, 4b, 4c diode laser
4d, 4h diode laser
5 diode laser arrangement
6, 6a, 6b, 6c laser optics
6d, 6h laser optics
7 laser chip
8 fast axis collimator (in the y-z plane)
9 slow axis collimator (in the x-z plane)
10, 10a, 10b cylinder lens
11, 11a, 11b cylinder lens
12 focussing optics
13 line focus
14 tangent
15 table
16 control means
17 rotation unit
18 optical coupling element
19, 20 module
21, 21a module
22 module
32 rotary module
33 rotary prism
34 optical axis
35 beam entry surface
36 beam exit surface
37 bottom surface

What is claimed is:

1. A device for treating a workpiece with a laser beam on a surface of said workpiece along a machining contour, said device comprising:
   a laser head having:
      a diode laser arrangement with a plurality of emitters formed on at least one chip, each emitter having an active laser light emitting layer for generating an emitter-laser-beam, said layer extending in a second axial direction (slow-axis), and perpendicular to a first axial direction (fast-axis), and
      slow axis and fast axis collimators for said emitters consisting of microcylinder lenses forming said laser beam from said emitter-laser-beams of said plurality of emitters, said laser beam having a longitudinal cross section with a major extension in said second axial direction (slow axis),
   laser optics focusing said laser beam on the surface in a focus having a longitudinal extension; and
   means for turning said laser head around a center of said focus point such that the longitudinal extension of said focus point forms a tangent to said machining contour.

2. A device as claimed in claim 1, further comprising negative expanding optic means for reducing the width of the laser beam delivered from said plurality of emitters.

3. A device as claimed in claim 1, wherein expansion of the width of the laser beam is performed in the beam path after the slow axis collimator.

4. A device as claimed in claim 1, further comprising expansion optic means for expanding the width of the laser beam in a direction (fast axis) perpendicular to the active layer of said emitters.

5. A device as claimed in claim 1, wherein the laser optics comprise optical coupling elements for forming a single laser beam from the laser beams of all the laser diode arrangements, said optical coupling elements are one of a shortpass filter, longpass filter, or bandpass filter.

6. A device as claimed in claim 1, wherein the laser beam source is formed by a plurality of diode laser arrangements each generating a laser beam, wherein the laser optics comprise optical coupling elements for combining said laser beams to a common laser beam, and wherein one of the modules contains said plurality of diode laser arrangements and said optical coupling elements.

7. A device as claimed in claim 1, further comprising expansion optic means for expanding the width of the laser beam in a direction (fast axis) perpendicular to the active layer of said emitters.

8. A device as claimed in claim 1, wherein said laser beam formed by said slow axis and fast axis collimators is a beam collimated in respect to both the fast and slow axes.

9. A device for treating a workpiece with a laser beam on a surface of said workpiece along a machining contour, said device comprising:
   a laser head having:
      a diode laser arrangement with a plurality of emitters formed on at least one chip, each emitter having an active laser light emitting layer for generating an emitter-laser-beam, said layer is perpendicular to a first axial direction (fast-axis) and extending in a second axial direction (slow-axis), and
      slow axis and fast axis collimators for said emitters consisting of microcylinder lenses forming said laser beam from said emitter-laser-beams of said plurality of emitters, said laser beam having a longitudinal cross section with a major extension in said second axial direction (slow axis),
   laser optics focusing said laser beam on the surface in a focus having a longitudinal extension; and
   means for turning said laser head together with the laser optics around a center of said focus point such that the longitudinal extension of said focus point forms a tangent to said machining contour.

10. A device as claimed in claim 9, further comprising positive expansion optic means for increasing the width of the laser beam delivered by said plurality of emitters or a negative expanding optic means for reducing the width of the laser beam delivered from said plurality of laser light emitters.

11. A device as claimed in claim 10, wherein the expansion of the width of the laser beam being performed in the beam path after the slow axis collimator.

12. A device as claimed in claim 9, having a modular structure comprising several modules which are coupled to one another, wherein at least one module contains at least one diode laser arrangement and other modules contain components of said laser optics.

13. A device as claimed in claim 9, wherein said laser beam formed by said slow axis and fast axis collimators is a beam collimated in respect to both the fast and slow axes.

14. A device for treating a workpiece with a laser beam on a surface of said workpiece along a machining contour, said device comprising:
   a laser head having:
      a diode laser arrangement with a plurality of emitters formed on at least one chip, each emitter having an active laser light emitting layer for generating an emitter-laser-beam, said layer is perpendicular to a first axial direction (fast-axis) and extending in a second axial direction (slow-axis), and
      slow axis and fast axis collimators for said emitters consisting of microcylinder lenses forming said laser beam from said emitter-laser-beams of said plurality of emitters, said laser beam having a longitudinal cross section with a major extension in said second axial direction (slow axis),
   laser optics having a dove prism and focusing said laser beam on the surface in a focus having a longitudinal extension; and
   means for rotating said dove prism around its optical axis such that the longitudinal extension of said focus point forms a tangent to said machining contour.

15. A method for treating a workpiece with a laser beam on a surface of said workpiece along a machining contour, said method comprising:
   using a laser head having:
      a diode laser arrangement with a plurality of emitters formed on at least one chip, each emitter having an active laser light emitting layer for generating an emitter-laser-beam, said layer is perpendicular to a first axial direction (fast-axis), and extending in a second axial direction (slow-axis), and
      slow axis and fast axis collimators for said emitters consisting of microcylinder lenses forming said laser beam from said emitter-laser-beams of said plurality of emitters, said laser beam having a longitudinal cross section with a major extension in said second axial direction (slow axis),
   using laser optics to focus said laser beam on the surface in a focus having a longitudinal extension; and
   turning said laser head around a center of said focus point such that the longitudinal extension of said focus point forms a tangent to said machining contour.

16. A method as claimed in claim 15, wherein said laser beam is formed by said slow axis and fast axis collimators as a beam collimated in respect to both the fast and slow axes.

17. A method for treating a workpiece with a laser beam on a surface of said workpiece along a machining contour, said method comprising:
   using a laser head having:
      a diode laser arrangement with a plurality of emitters formed on at least one chip, each emitter having an active laser light emitting layer for generating an emitter-laser-beam, said layer is perpendicular to a first axial direction (fast-axis) and extending in a second axial direction (slow-axis), and
      slow axis and fast axis collimators for said emitters consisting of microcylinder lenses forming said laser beam from said emitter-laser-beams of said plurality of emitters, said laser beam having a longitudinal cross section with a major extension in said second axial direction (slow axis),
   using laser optics to focus said laser beam on the surface in a focus having a longitudinal extension; and
   turning said laser head together with the laser optics around a center of said focus point such that the longitudinal extension of said focus point forms a tangent to said machining contour.

18. A method as claimed in claim 17, wherein said laser beam is formed by said slow axis and fast axis collimators as a beam collimated in respect to both the fast and slow axes.

19. A method for treating a workpiece with a laser beam on a surface of said workpiece along a machining contour, said method comprising:
   using a laser head having:
      a diode laser arrangement with a plurality of emitters formed on at least one chip, each emitter having an active laser light emitting layer for generating an emitter-laser-beam which layer is perpendicular to a first axial direction (fast-axis) and extends in a second axial direction (slow-axis), and slow axis and a fast axis collimators for said emitters consisting of microcylinder lenses forming said laser beam from said emitter-laser-beams of said plurality of emitters, said laser beam having a longitudinal cross section with a major extension in said second axial direction (slow axis), using a laser optics having a dove prism and focusing said laser beam on the surface in a focus having a longitudinal extension; and rotating said dove prism around its optical axis such that the longitudinal extension of said focus point forms a tangent to said machining contour.

* * * * *